Figure 1:
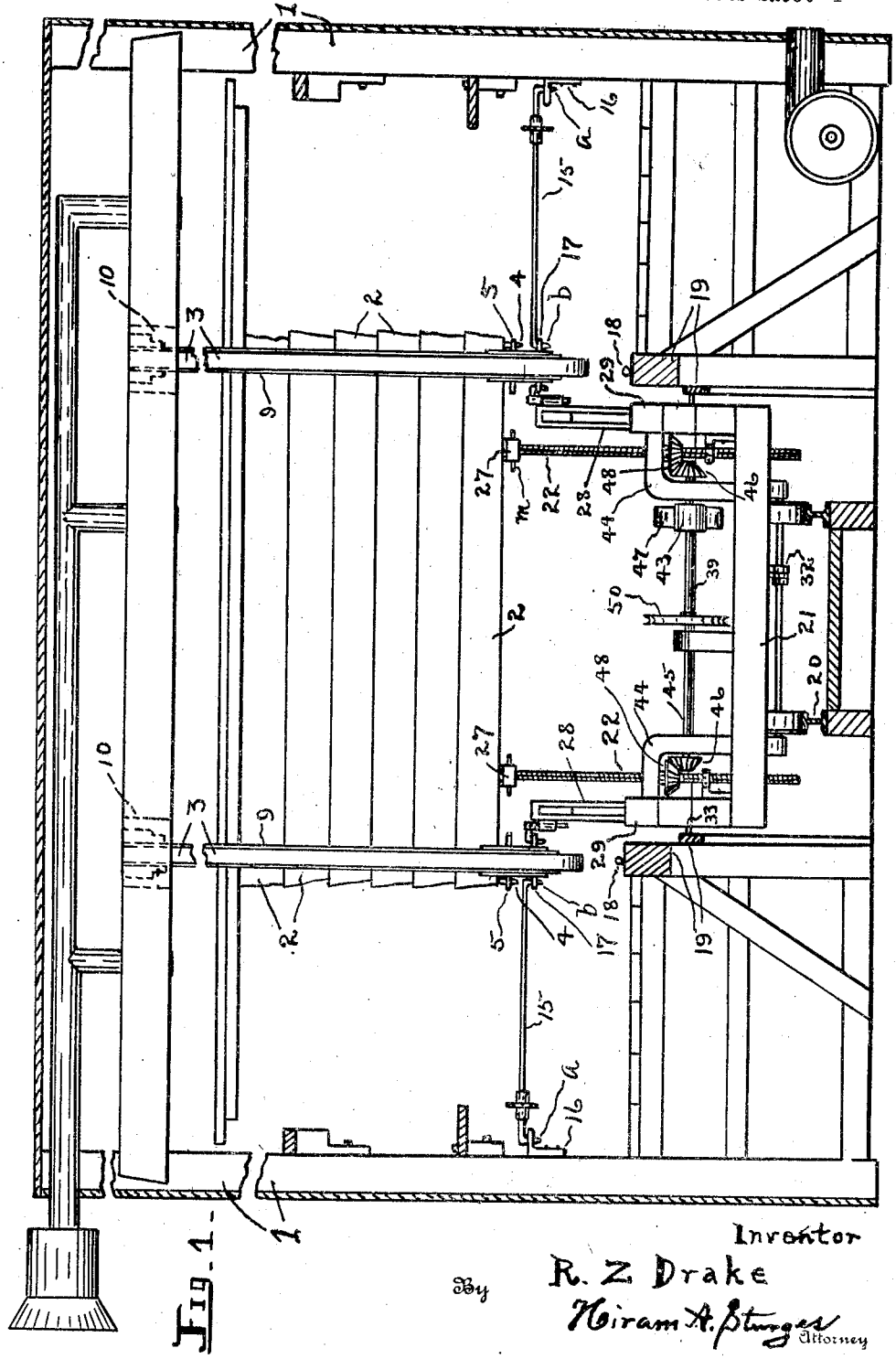

June 15, 1926.  
R. Z. DRAKE  
1,588,950  
LUMBER UNLOADING MECHANISM FOR SEASONING HOUSES  
Filed June 13, 1924   9 Sheets-Sheet 1

Inventor  
R. Z. Drake  
By Hiram A. Sturges  
Attorney

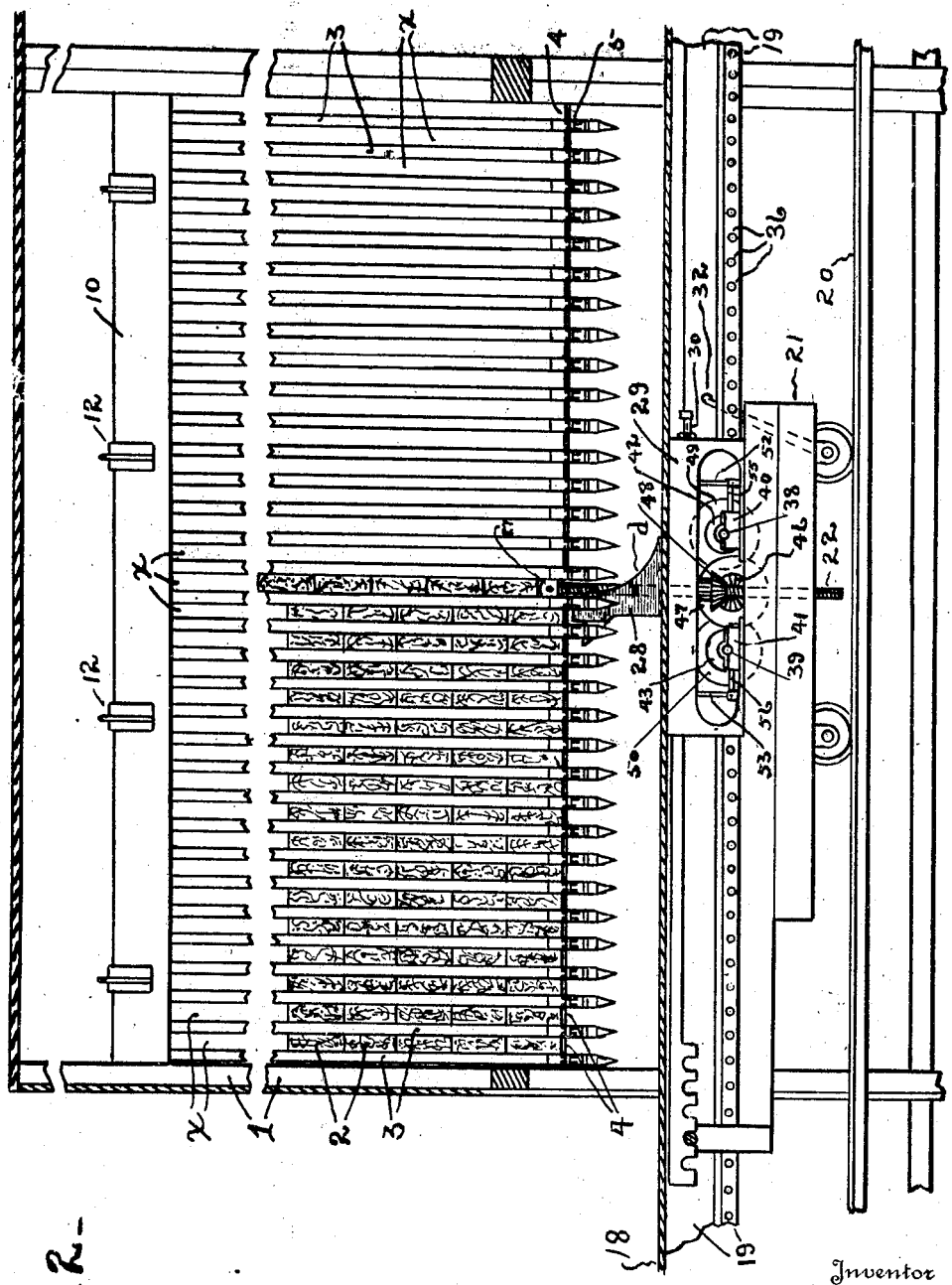

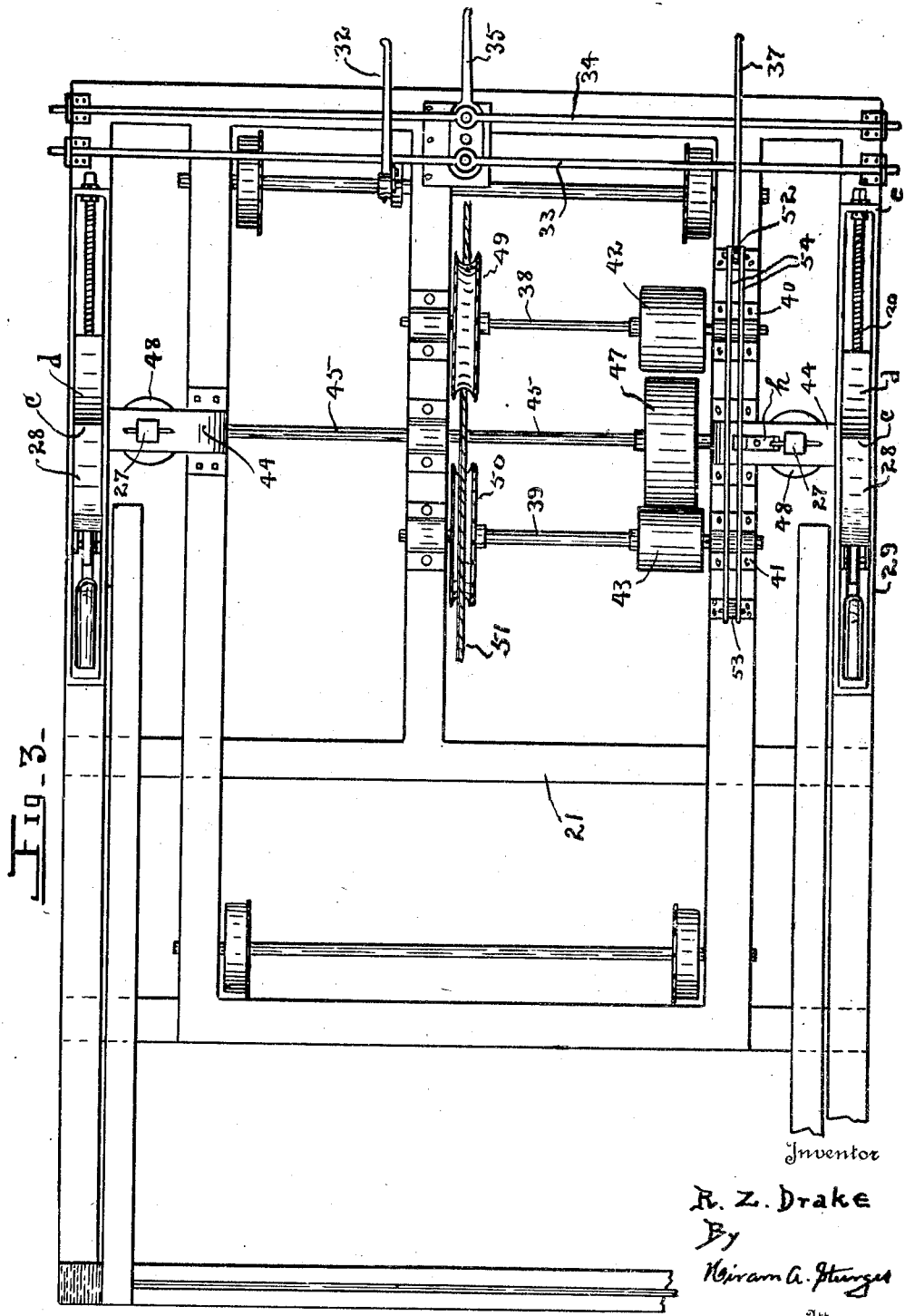

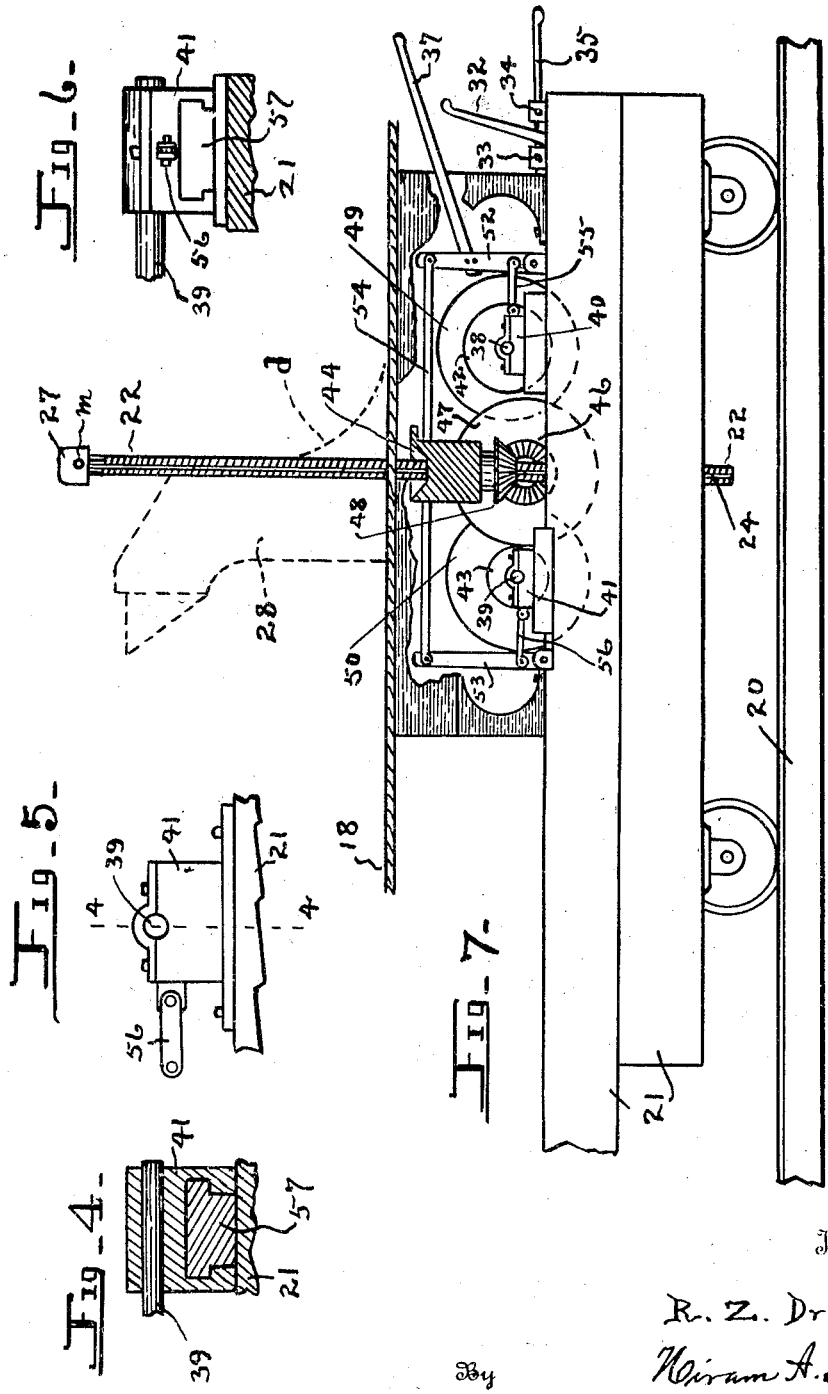

June 15, 1926. 1,588,950
R. Z. DRAKE
LUMBER UNLOADING MECHANISM FOR SEASONING HOUSES
Filed June 13, 1924 9 Sheets-Sheet 5
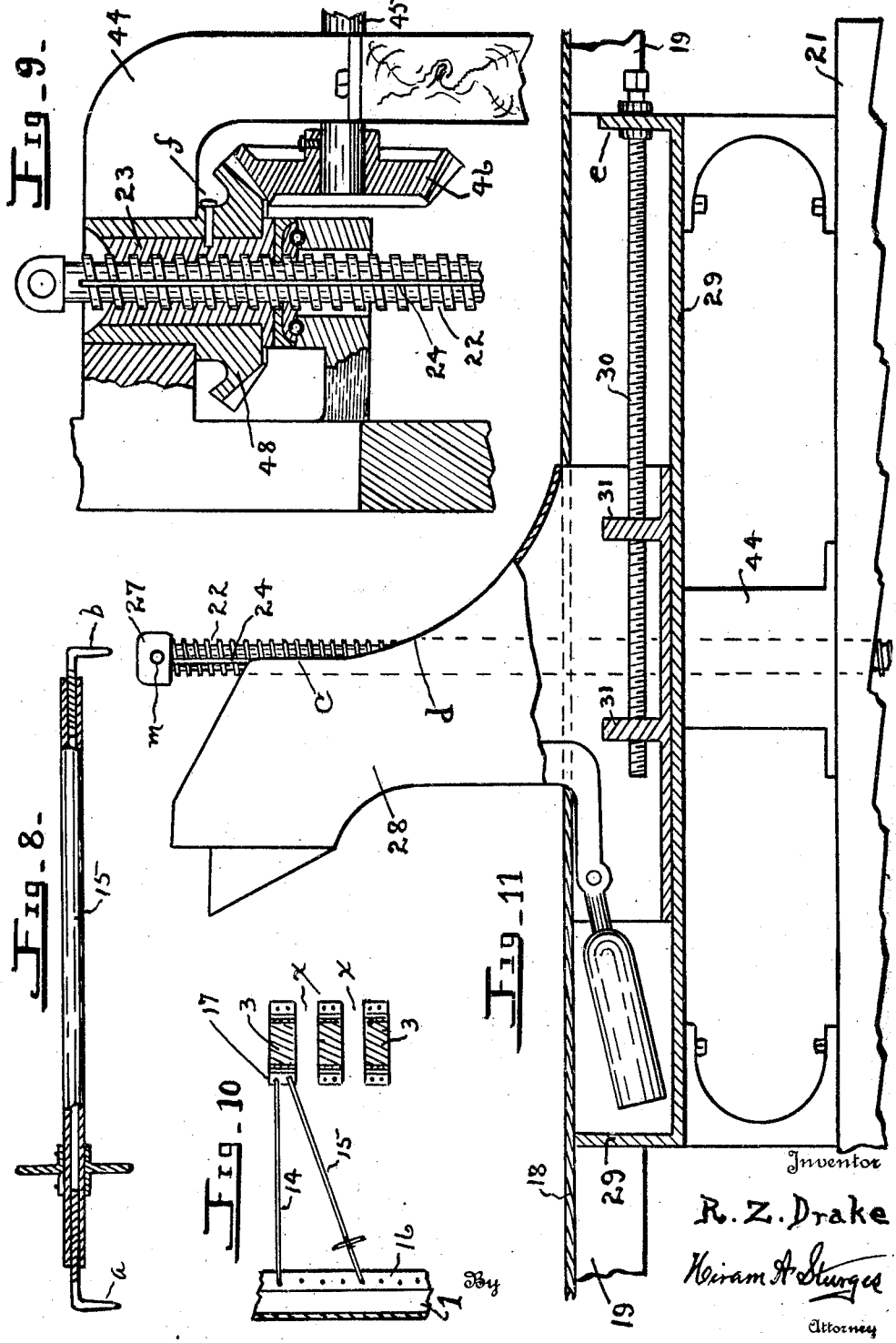
Inventor
R. Z. Drake
Hiram A. Sturges
Attorney

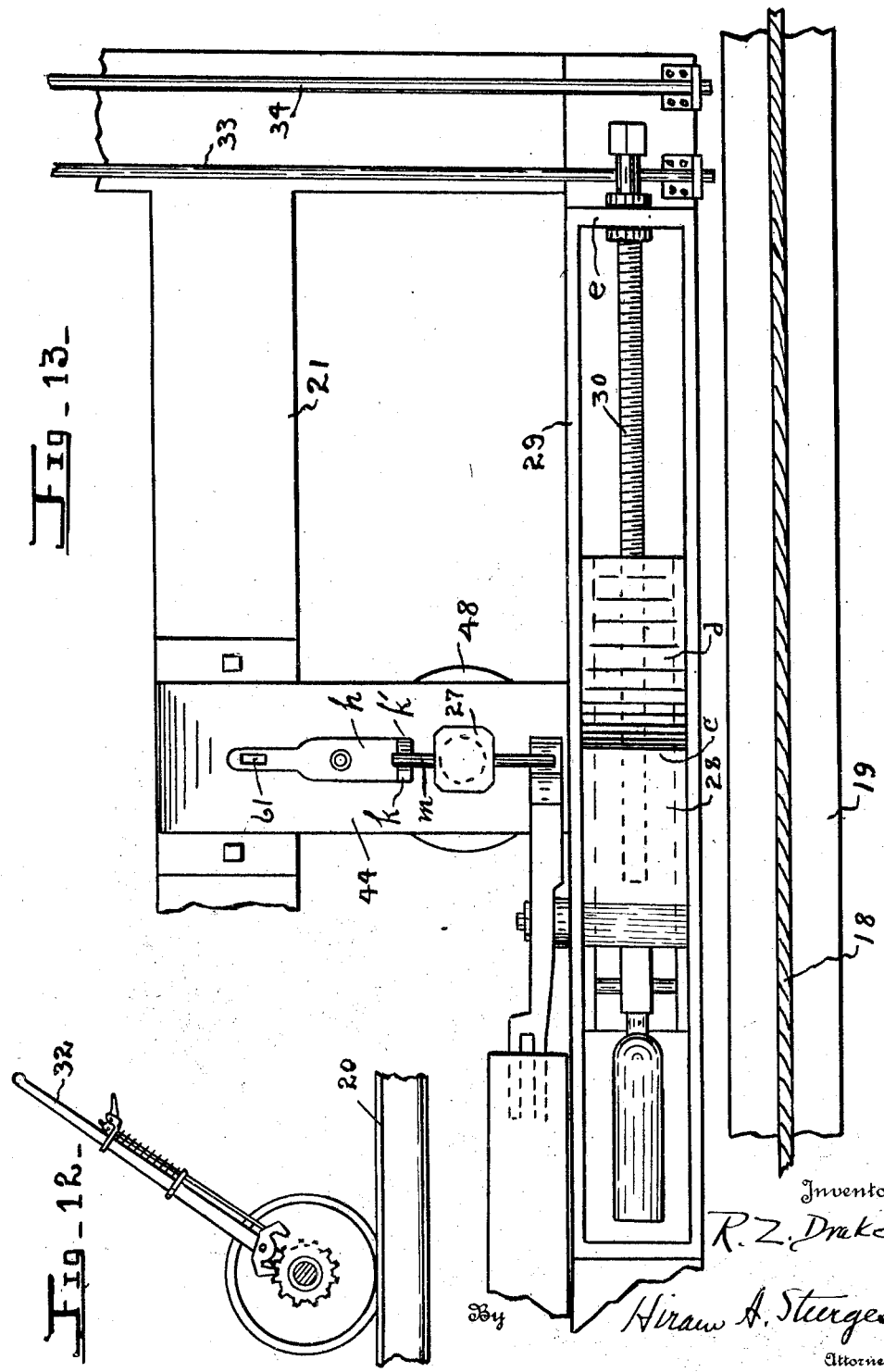

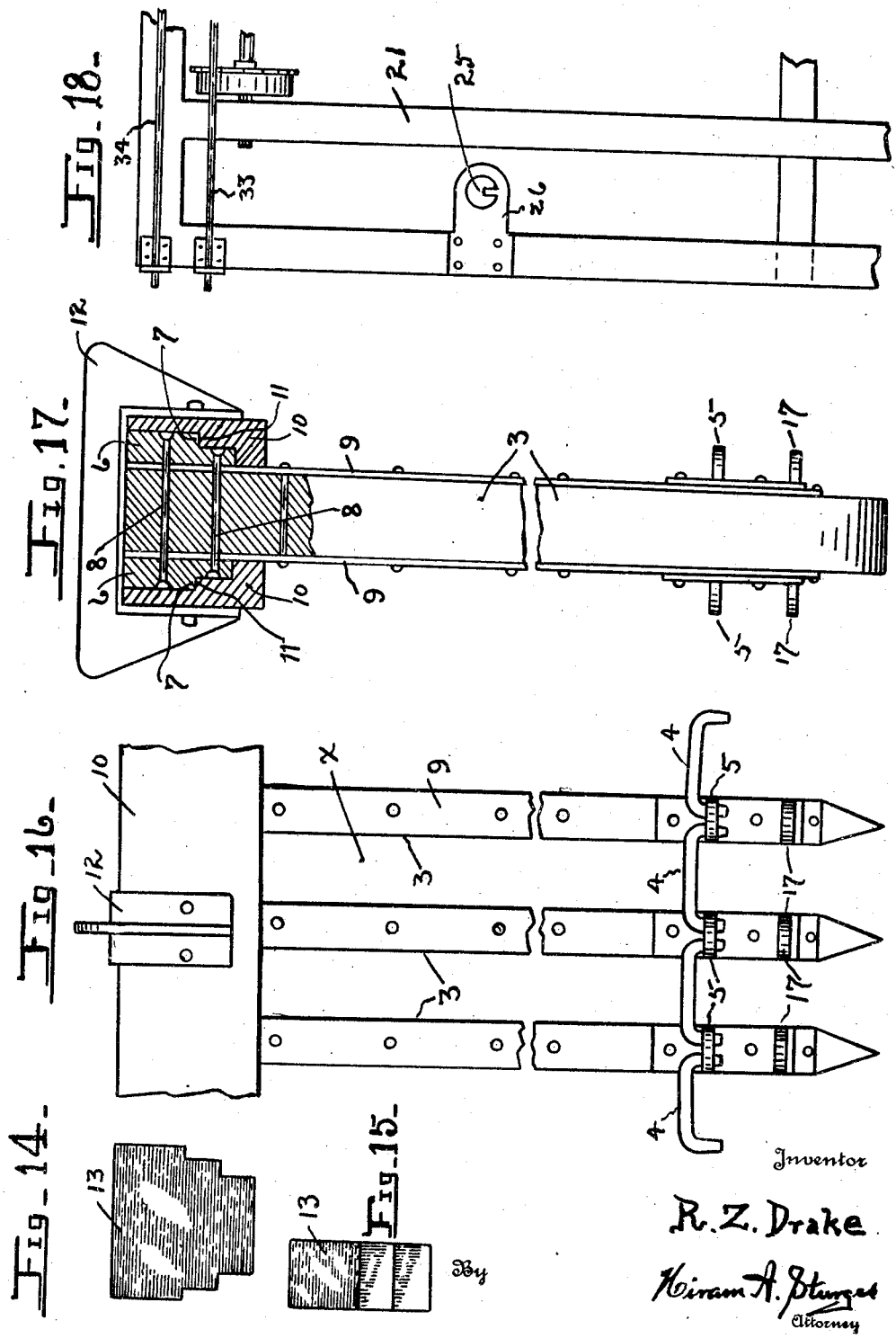

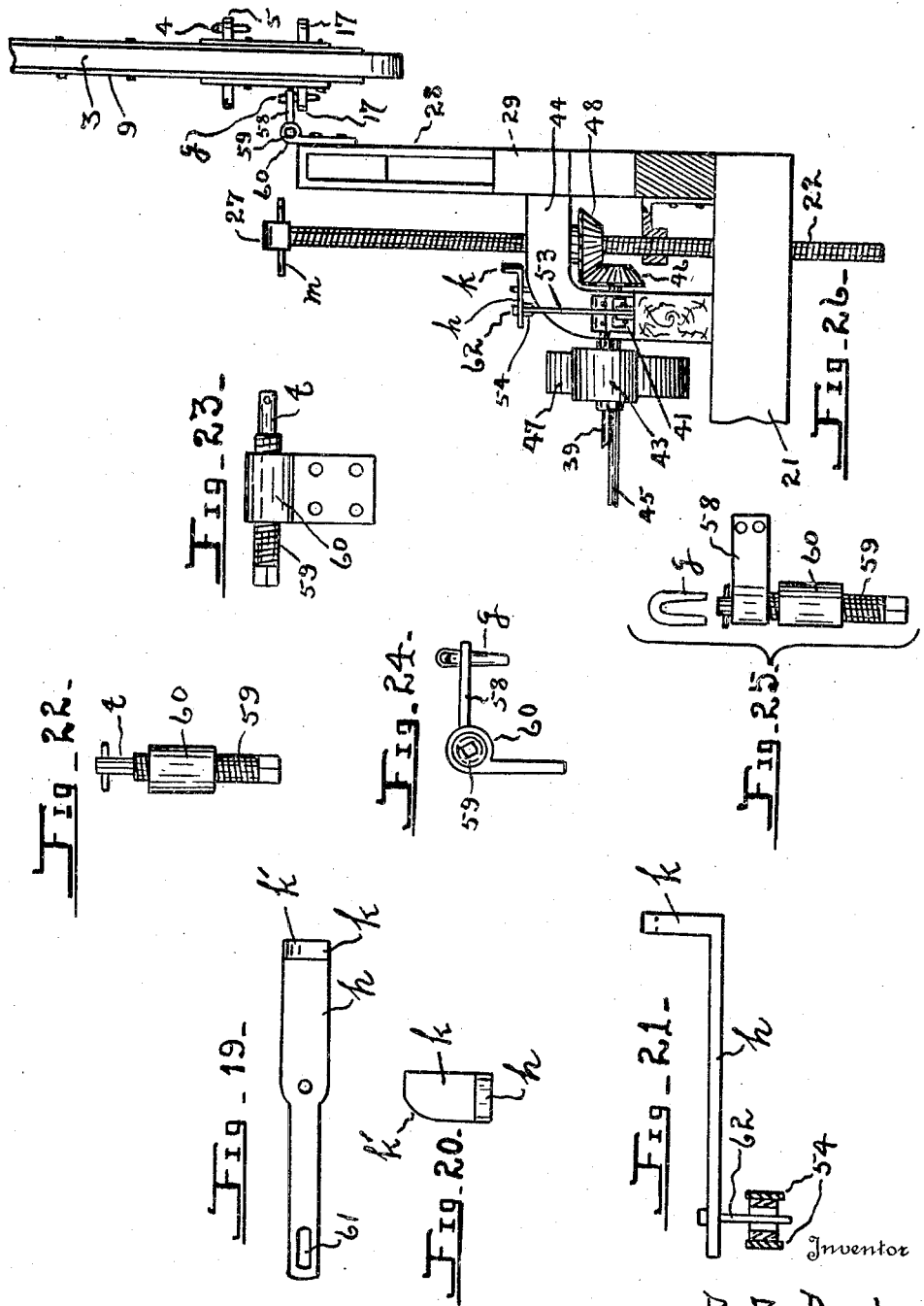

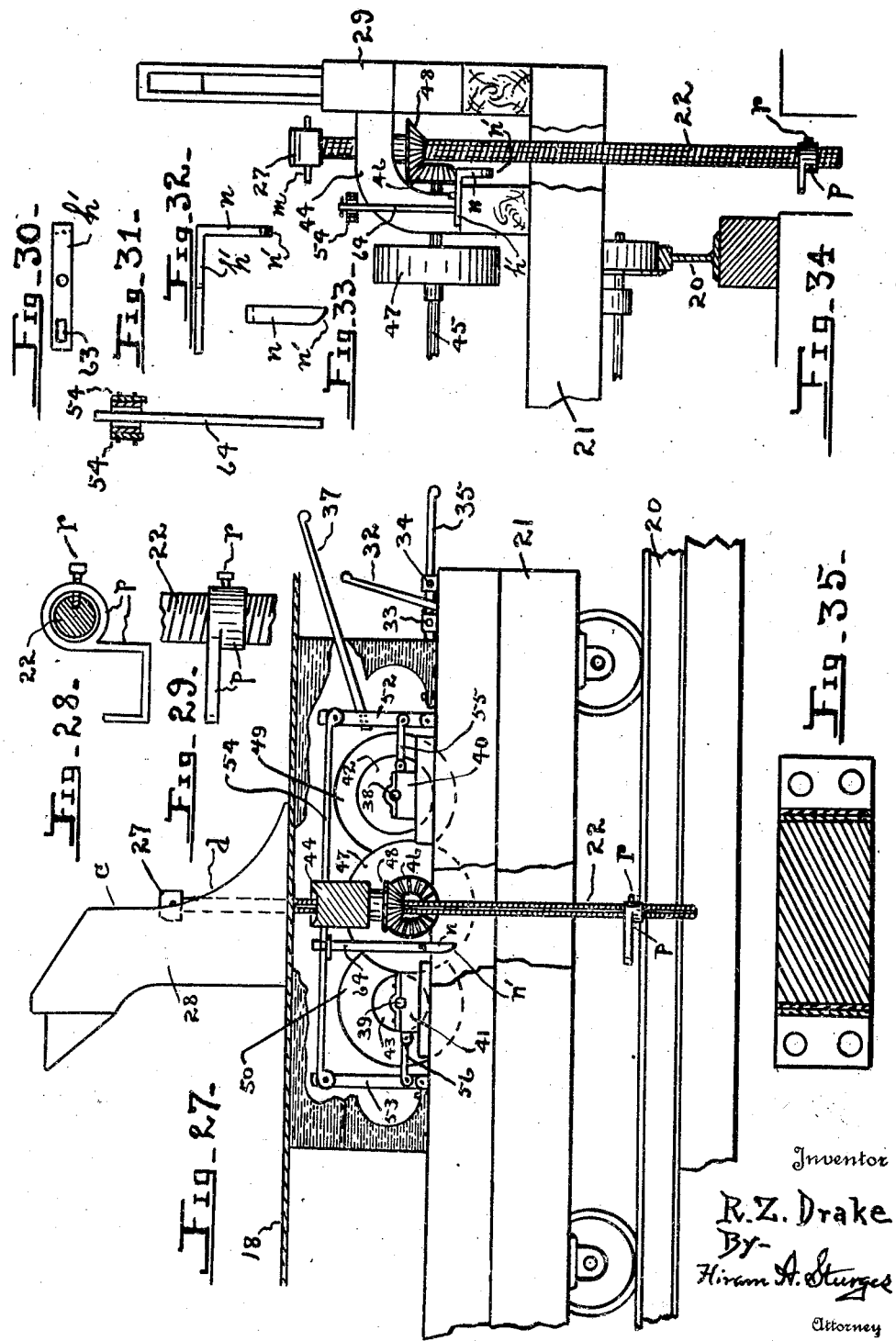

Patented June 15, 1926.

1,588,950

UNITED STATES PATENT OFFICE.

ROBERT Z. DRAKE, OF OMAHA, NEBRASKA.

LUMBER-UNLOADING MECHANISM FOR SEASONING HOUSES.

Application filed June 13, 1924. Serial No. 719,732.

This invention relates to mechanism for unloading lumber from a seasoning house, and more particularly the unloading of lumber which has been stored on edge vertically between upright hanger elements.

Among the objects of this invention is to provide novel means for unloading lumber from vertical hanger elements.

A further object is to effect the facile unloading from vertical hanger elements of lumber in a seasoning house in which the lumber is when stored disposed edge to edge vertically, and during the unloading to lower the lumber, and during the lowering movement to change it from a vertical position to a horizontal position without shock.

Another object is to provide in this type of mechanism means for adjusting longitudinally of its track a car positioned below the stored lumber for movement along the ends of the lumber section, and further provide means for securing the car in stationary position opposite any section desired; a further object is to provide a movable horizontal carrier for conducting the lumber away after it has been unloaded from the hanger elements; a further object is to provide means for maintaining the hanger bars in stationary relation relative to each other and stationary with the seasoning house while the lumber is being unloaded.

Another object is the provision of a pair of unloader blocks for receiving the lumber from the hanger elements to transfer it from a vertical to a horizontal position, and further to provide means for adjusting said unloader blocks longitudinally of the car to enable the positioning of said blocks in proper position to align with its cooperating parts during unloading.

Another object is the provision of means for automatically terminating the vertical movement of the vertically movable lumber transferring elements at a desired point in their travel to prevent the accidental movement of these parts further than desired.

Further objects, advantages and capabilities will later become more readily apparent.

With the foregoing objects in view and others to be mentioned hereinafter, the invention presents a novel and useful construction, combination and arrangement of parts as described herein and claimed, and as illustrated in the accompanying drawings, it being understood that changes in form, size, proportion and minor details may be made without departing from the spirit of my invention.

In the drawing, Fig. 1 is a view showing a part of a seasoning house in transverse section, together with lumber unloading mechanism, also showing a pair of hanger-bars and one of the sections of sawed lumber, adjusting-rods being shown for stabilizing the hanger-bars. Fig. 2 is a view of parts taken at right-angles to the view shown in Fig. 1, sections of lumber being shown between certain of the adjacently disposed, connected hanger-bars. Fig. 3 is a plan view of the unloading mechanism and the car frame. Figs. 4, 5 and 6 are detail views relating to Fig. 7. Fig. 4 is a sectional view on line 4—4 of Fig. 5. Fig. 5 is a side view of a box providing bearings for the shaft of one of the transversely movable, friction rollers. Fig. 6 is an end view of the box shown in Fig. 5. Fig. 7 is a broken away, side view of the car.

Fig. 8 is a side view, partly in section, of an adjusting-rod. Fig. 9 is a view, partly in section, to illustrate the mounting of a screw or unloading-bar. Fig. 10 is a broken away, plan view showing the mounting of a pair of adjusting-rods. Fig. 11 is a side view, partly in section, showing the mounting for a buffer-block or guide. Fig. 12 is a side view of a hand lever for moving the car. Fig. 13 is a plan view of parts shown in Fig. 11.

Fig. 14 is a side view of a spacer-block. Fig. 15 is an edgewise view of the spacer-block shown in Fig. 14. Fig. 16 is a detail illustrating reinforced hanger-bars, their tie-bars and their mounting in a girder, and showing a girder-clamp. Fig. 17 is a view, partly in section, showing a hanger-bar, a two-part girder and a girder-clamp, said view being taken at right-angles to the parts shown in Fig. 16. Fig. 18 is a detail relating to Fig. 3, to show a lug for engaging in a slot of a screw or unloader-bar.

Fig. 19 is a plan view of a rock-bar or stop-member. Fig. 20 is an end view of the same. Fig. 21 is a side view of the rock-bar shown in Figs. 19 and 20, a connecting-bolt being shown engaging in a block which is secured to a pair of links.

Fig. 22 is a plan view of a bracket or holder for the adjustable bolt of an apertured coupling-plate shown in Fig. 24. Fig.

23 is a side view of the holder shown in Fig. 22. Fig. 24 is a side view of an apertured plate, its staple and its bolt. Fig. 25 is a plan view of the apertured coupling-plate and staple shown in Figs. 24 and 26. Fig. 26 is a broken away detail to illustrate relative positions of the rock-bar shown in Fig. 21 and the apertured coupling-plate shown in Fig. 24.

Fig. 27 is a broken away side view of a car frame showing parts thereon for terminating an upward sliding movement of the unloader-bars or screws. Fig. 28 is a plan view of a set-ring, an unloader-bar being shown in transverse section. Fig. 29 is a side view of the set-ring shown in Fig. 28. Figs. 30, 31, 32 and 33 are detail views relating to Figs. 27 and 34. Fig. 30 is a plan view of a rock-lever. Fig. 31 shows an upright actuating-bolt secured to a pair of links, said links being in section. Fig. 32 is a side view of the rock-lever shown in Fig. 30, and Fig. 33 is an end view of the same. Fig. 34 is a broken away end view of the car frame, showing parts thereon for terminating an upward movement of the unloader-bars. Fig. 35 shows a hanger-bar and its brackets in transverse section.

Referring to the drawing for a particular description, numeral 1 indicates a seasoning house for the storage of sawed lumber, designated herein as planks 2, said planks being disposed edge upon edge in the spaces $x$ between upright, reinforced hanger-bars 3, these bars being employed in pairs, the bars of one pair being disposed approximately parallel with and adjacent to the bars of another pair, as shown in Fig. 2, the spaces $x$ between said pairs of bars corresponding, of course, to the thickness of the planks.

Since the hanger-bars may have a considerable length, the weight of lumber in each section $x$ may be very great. Numerals 4 indicate tie-bars which are employed for supporting the weight of the lumber, these being of inverted U-shape and adapted to engage in apertured brackets 5 which are secured to the hanger-bars, near the lower ends thereof.

In order that undue shocks and vibration, during the operation of unloading the lumber may be avoided, it is necessary that the hanger-bars may have an adequate support. For this purpose the upper end of each hanger-bar is provided with a pair of opposed detent-blocks 6 (Fig. 17,) having projections 7, said blocks being secured to the hanger-bars by bolts 8 which extend through metallic reinforcing-strips 9, said detent-blocks being mounted in a two-part girder, indicated by numerals 10, each member 10 having ledges 11 adapted to be engaged by the projections 7 of the detent-blocks. Numerals 12 indicate clamping-blocks for use in pressing members 10 toward each other. Numerals 13 (Figs. 14, 15,) indicate spacing-blocks which are disposed between the detent-blocks, their thickness corresponding to the thickness of the planks in the several lumber-sections $x$.

Undue shocks which otherwise might occur while unloading the lumber are, in a large measure, prevented by use of adjusting-rods 14 and 15 (Figs. 1, 8, 10), these rods being used in pairs, each rod having a hook $a$ for engaging in an apertured ledge 16 provided for the seasoning house, and having a hook $b$ for engaging in an apertured bracket 17 upon the lower end portion of a hanger-bar. The rods 14 are preferably disposed parallel with the lumber sections, and the rods 15 are disposed in angular relation to the rods 14 so that adjustments may be made relative to each other and tending to secure said bars in stationary relation with the apertured ledges 16 and with the hanger-bars, it being remembered that the hanger-bars are connected near their lower ends by means of the tie-bars 4.

Each rod 14 and 15, as best shown in Fig. 8, is preferably of tubular construction, and is reversely threaded near its ends for receiving the hooks $a$ and $b$, and by rotating the rods, or either of them, adjustments may be made for the purposes described.

The sawed lumber, in the operation of unloading, is moved upon cables 18, said cables, for convenience, being designated herein as a carrier, and being movable by any suitable means upon a pair of stationary side supports 19.

Midway between the supports 19 is a track 20 for a car frame 21, upon which certain mechanism is mounted and used for unloading the lumber. Numerals 22 indicate a pair of reversely threaded, upright screws or unloader-bars which do not rotate but are adapted to have vertical sliding movements on the car by means of a pair of revoluble, interiorly threaded sleeves 23, one of these sleeves being clearly shown in Fig. 9. Each bar 22 is provided longitudinally with a slot 24 for receiving a lug 25 formed in a plate 26, as best shown in Fig. 18 of the drawings, each bar 22, at its upper end, being provided with pins or projections $m$, and having a cap 27 adapted to engage the lumber or planks.

Numerals 28 indicate a pair of buffer-blocks or guides which the planks of a section engage during the operation of unloading, each buffer-block preferably being formed as a casing and, preferably having a part $c$ formed as a vertical contact-face, and having a part $d$ of suitable concave form so that the planks of a section will slide smoothly thereon and while moving will remain practically parallel with their longitudinal edges in contact, all of the planks of a lumber section moving coincidently downward upon the moving cables or carrier 18.

Each buffer-block or casing 28 is slidingly mounted in a box 29 which is suitably secured to the car frame, and is adapted to be adjusted longitudinally thereof by any suitable means, the means herein shown consisting of a screw 30 adapted to be rotated, said screw 30 being threaded in the projections 31 of the unloader block and having bearings (Figs. 11, 13,) near one of its ends in an end e of the box.

In operation, adjustments having been made of the unloader-blocks 28 by use of screws 30, relative to the position of the unloader-bars 22, so that the planks, when sliding downwardly, will suitably engage the contact-faces c and d of said blocks 28, the car is then moved by use of a hand-lever 32 so that the unloader-bars 22 will be disposed in the vertical plane of a lumber-section x, and the car is secured in a stationary position by means of pawl-rods 33 and 34 movable by a hand-lever 35, said pawl-rods moving in alternation into apertures 36 (Fig. 2) of the side supports 19 for this purpose.

It will be understood that, in operation, the lumber-sections x are unloaded in succession, and that the tie-bars 4 which connect the hanger-bars for a section must be removed before said section may be unloaded. The unloader-bars 22 are moved upwardly by means hereinafter described for elevating the planks of a lumber section to permit removal of the tie-bars mentioned, the caps 27 engaging the edge of the lowermost plank of said section. The tie-bars mentioned being removed, the unloader-bars 22 are then moved downwardly to permit unloading of the planks, the weight of the planks of said lumber-section being supported by said members 22.

It will be noted by referring to Figs. 2, 16 and 17 that the lower ends of the hanger-bars are formed downwardly convergent, and as shown in Fig. 2 of the drawings, the unloader-blocks or guides 28 are of such length and proportion that the vertical faces c co-operate with the hanger-bars to act as guides. It will be understood that during the downward movements of the unloader-bars 22 and when said bars together with their caps are disposed in a plane inwardly of the concave face d, all of the planks of said section will slide downwardly upon the moving cables 18. During the movement of the planks of a section they will remain substantially parallel, the edges of one plank remaining in contact with the planks adjacent thereto, no defacement or injury to the planks occurring by this operation.

The car is then moved a limited distance by use of the hand-lever 32 to dispose the screws or unloader-bars in the plane of another lumber-section to be unloaded, and the car is maintained in a stationary position by use of the pawl-rods as mentioned. The members 22 are then moved upwardly for elevating the several planks of said section to permit removal of the tie-bars which supported the weight of the planks of that section. Said members 22 are then moved downwardly to permit unloading, as before mentioned, each operation for unloading a section being similar and requiring a very limited time, and requiring practically no attention of an operator except the use of the hand-levers and the manual removal of the tie-bars mentioned.

The vertical movements of the screws or unloader-bars 22 are under control of a hand-lever 37. Numerals 38 and 39 indicate a pair of horizontal shafts adapted to be rotated in reverse directions, the outer end of the shaft 38 being journalled in a slide-box 40 and the outer end of the shaft 39 being journalled in a slide-box 41. At 42 is indicated a friction roller which is mounted on the shaft 38, and a friction roller 43 is mounted on the shaft 39.

Numerals 44 indicate a pair of yokes which are provided for the car frame, each having a part disposed between the shafts 38 and 39. At 45 is indicated an idler shaft having end portions journalled in the yokes and provided with gear-wheels 46, said shaft having a friction roller 47 disposed between the rollers 42 and 43.

Numerals 48 indicate a pair of miter gears, each being mounted on a sleeve 23 and having bearings in a yoke 44 and engaging a miter gear wheel 46. Each miter gear wheel 48 is suitably secured to a sleeve 23, as by use of a key f (Fig. 9), and it will be understood that when the idler shaft 45 is rotated in one direction the interiorly threaded sleeves will be rotated for elevating the unloader-bars or screws 22, any rotatable movement of the screws being prevented by the lugs 25 which engage in the slots 24, a rotation in a reverse direction of the idler shaft causing downward sliding movements of said unloader bars.

Numerals 49 and 50 indicate pulleys which are mounted upon the respective shafts 38 and 39, and by use of a cable 51 (Fig. 3) movable by any suitable means, these shafts and the friction rollers thereon may rotate in reverse directions, said cable engaging the upper part of one and the lower part of the other pulley mentioned.

Numerals 52 and 53 indicate a pair of upright rock-levers adapted to be actuated by the hand-lever 37, said rock-levers being pivotally connected at their upper ends by a pair of horizontal links 54, and their lower ends being pivotally mounted upon the car frame.

Numeral 55 indicates a link which pivotally connects the lever 52 with the box 40, and a link 56 pivotally connects the lever 53 with the box 41. Each box is slidingly mounted on a core 57 which is stationary with the car frame.

It will be seen that a downward movement of the hand-lever 37 will cause engagement of the friction roller 43 of the shaft 39 with the friction roller 47 of the idler shaft 45 for rotating said shaft 45 in one direction, the friction roller 42 being disengaged coincidently from the friction roller 47; and it is obvious that the idler shaft may be rotated in a direction reverse to that last mentioned by use of said hand-lever 37 since an upward movement thereof will cause engagement of the roller 42 with the roller 47, the roller 43 being moved out of engagement with said roller 47.

It will be appreciated that the downward sliding movement of all of the planks, in the operation of unloading each section, will cause forceful stresses to be directed to the buffer-blocks or guides 28, depending upon the height of a section and the weight or thickness of the planks. Therefore the blocks or guides 28 may be secured to the hanger-bars adjacent to a section $x$, the means for this purpose being best shown in Figs. 22, 23, 24, 25 and 26 of the drawings, and consisting, in part, of apertured coupling-plates 58 and staples $g$, said staples being adapted to engage in the apertures of said plates and in the apertures of the brackets 17 of the hanger-bars, each plate being pivotally mounted on a terminal part $t$ of a screw-bolt 59, the latter being threaded in a holder 60 adapted to be secured to a casing or unloading-block 28. By rotating the bolt 59 the apertured plates may be moved to permit suitable engagement of the staples $g$ in the apertures of said plates and in said apertured brackets 17.

In order that the screws or unloader-bars 22 will not move downwardly or upwardly an undue distance, which might cause breakage of the mechanism and might be caused by a careless operator when using the lever 37 unless an automatic control was provided, means are employed to prevent a contact of either of the friction rollers 42 or 43 with the friction roller 47 of shaft 45, said non-contact to occur when said members 22 have moved downward or upward adjacent to their lowermost or uppermost positions, said means consisting, in part, of rock-levers $h$ and $h'$, the rock-lever $h$ having a pivotal mounting approximately at its middle upon the yoke 44, its inner end having an upright contact-piece $k$ with an inclined face $k'$ adapted to be engaged by a pin or projection $m$ mounted on one of said members 22, the outer end of said lever $h$ being provided with an aperture 61, best shown in Figs. 13 and 19 of the drawings, for receiving the upper end of the upright actuating-bolt 62, the lower end of said bolt 62 engaging in a block which is secured to the links 54 (Fig. 21), and it will be understood that when members 22 move downwardly a sufficient distance, the pin $m$ of one of said unloader-bars will engage the inclined part of the contact-piece $k$ and said lever $h$ will have a swinging movement, the actuating-bolt 62 being moved for moving the links 54, the result being that the roller 47 will not be engaged by the rollers 42 or 43.

The rock-lever $h'$ has a pivotal mounting approximately at its middle upon a part of the car frame 3, its inner end having a downwardly projecting contact-piece $n$ with an inclined face $n'$ adapted to be engaged by a set-ring $p$, and this set-ring $p$ is adapted to be placed on one of the members 22, and when so placed is adapted to be secured thereto by a set-screw $r$, the outer end of said rock-lever $h'$ being provided with an aperture 63 (Fig. 30) for receiving the lower end of the downwardly projecting actuating-bolt 64, the upper end of said bolt 64 engaging in a block which is secured to the links 54 (Figs. 31, 34), and it will be understood that when said members 22 move upwardly a sufficient distance, the set-ring $p$ on one of said members 22 will engage the inclined part of the contact-piece $n$ and said lever $h'$ will have a swinging movement, the actuating-bolt 64 being moved for moving the links 54, the result being that the roller 47 will not be engaged by the rollers 42 or 43.

Assuming that an upward movement of the hand lever 37, which causes the roller 42 to engage the roller 47, will cause members 22 to move downwardly, it will be seen that when members 22 have moved to, or approximately adjacent to, their lowermost positions, the pin $m$ of one of members 22 will engage the inclined part $k'$ and will cause a swinging movement of the lever $h$, its outer end and bolt 62 and links 54 moving toward said hand-lever 37 and thereby causing a limited outward movement of the lever 52 and link 55, the result being that the roller 42 will be immediately disengaged from the roller 47 to terminate any further downward movement of members 22, and thereby prevent any undue shocks or injury, the operation and proportion of parts being such that the contact of the pin $m$ with the inclined part $k'$ of the lever $h$ will cause a very limited movement of the box 40, together with the shaft 38 and said roller 42, but sufficient to cause disengagement of said roller 42 from the roller 47; and thereafter any further upward movement of the hand lever 37 will be prevented while the pin $m$ remains in engagement with the inclined part $k'$; but of course, this hand lever may be moved downwardly to permit engagement of the roller 43 with the roller 47 for causing members 22 to move upwardly.

Also assuming that a downward movement of the hand-lever 37, which causes the roller 43 to engage the roller 47, will cause said members 22 to move upwardly, it will be seen that when said members 22 have moved to, or approximately adjacent to, their uppermost positions, the set-ring $p$ of one of members 22 will engage the inclined part $n'$ and will cause a swinging movement of the lever $h'$, its outer end and the bolt 64 and links 54 moving in a direction away from said hand-lever 37, and thereby causing a limited outward movement of the lever 53 and link 56, the result being that the roller 43 will be immediately disengaged from the roller 47 to terminate any further upward movement of said members, 22, and thereby prevent any undue shocks or injury, the operation and proportion of parts being such that the contact of the set-ring $p$ with the inclined part $n'$ of the lever $h'$ will cause a very limited movement of the box 41 together with the shaft 39 and said roller 43, but sufficient to cause disengagement of said roller 43 from the roller 47; and thereafter, any further downward movement of the hand-lever 37 will be prevented while the set-ring $p$ remains in engagement with the inclined part $n'$, but this hand-lever may be moved upwardly to permit engagement of the roller 42 with the roller 47 for causing said members 22 to move downwardly.

I claim as my invention,—

1. In unloading mechanism for vertical lumber sections formed between hanger-bars disposed side by side, a movable carrier, unloader-blocks below the hanger-bars in the plane of a lumber section, means for moving upwardly into engagement with the lumber of a section and then moving downwardly for conducting lumber to the unloader-blocks for a delivery thereof to the movable carrier.

2. Unloading mechanism for upright, approximately parallel lumber sections formed between hanger-bars disposed adjacent to each other, consisting of a pair of flexible carriers movable approximately at right-angles to the lumber sections, a pair of unloader-blocks each disposed adjacent to a cable and having an inclined part, and a pair of unloader-bars movable upwardly for engaging the lumber of a section and movable downwardly for conducting lumber to the inclined parts of the unloader-blocks from whence it moves onto the movable cables.

3. In unloading mechanism for upright lumber sections formed between hanger-bars disposed side by side, a car below the hanger-bars, a movable carrier, unloader-blocks on the car, unloader-bars on the car adapted to move upwardly into engagement with the lumber of a section and adapted to move downwardly to conduct the lumber into engagement with the unloader-blocks for a delivery thereof to the movable carrier, said car being movable to dispose the unloader-blocks in the plane of a lumber section.

4. In unloading mechanism for upright lumber sections formed between adjacently disposed hanger-bars, a car below the hanger-bars, a movable carrier, unloader-blocks upon and adapted to be adjusted longitudinally of the car to be disposed in the plane of a lumber section, unloader-bars mounted on the car and adapted to be moved upwardly into engagement with the lumber of a section and adapted to be moved downwardly for conducting the lumber to the unloader-blocks for delivery thereof to said carrier.

5. In unloading mechanism for upright lumber sections formed between sets of adjacently disposed hanger-bars, a movable carrier, a car having a frame and disposed below the hanger-bars, a pair of unloader-blocks on the car frame, and longitudinally adjustable thereon, means for adjusting each of said unloader blocks with relation to said car for disposing said blocks in the plane of a lumber section, unloader-bars mounted on the car frame and adapted to be moved upwardly into engagement with the lumber of a section and adapted to be moved downwardly for conducting lumber to the unloader-blocks for delivery to the movable carrier.

6. In unloading mechanism for vertical, approximately parallel lumber sections formed between hanger-bars disposed side by side, a car, a movable carrier, unloader-blocks below the lumber sections and mounted on the car, unloader-bars on the car adapted to move upwardly for engaging the lumber of a section and adapted to move downwardly for conducting lumber to the unloader-blocks for delivery thereof to the movable carrier, means for moving the car at approximately right-angles to the lumber sections, and means for preventing a movement of the car.

7. In unloading mechanism for upright lumber sections formed between sets of adjacently disposed hanger-bars, a car including a frame and disposed below the lumber sections, a pair of unloader-blocks on the car frame, a pair of revoluble screws in bearings on the car frame each having a threaded connection with an unloader-block for disposing said block in the plane of a lumber section, unloader-bars mounted on the car and adapted to be moved upwardly into engagement with the lumber of a section and adapted to be moved downwardly for conducting the lumber to said unloader-blocks.

8. In unloading mechanism for vertical lumber sections formed between sets of adjacently disposed hanger-bars, unloader-blocks below the hanger-bars in the plane of a lumber-section, unloader-bars adapted to be moved upwardly into engagement with the lumber of a section and adapted to be moved downwardly to conduct said lumber to the unloader-blocks.

9. Unloading mechanism for upright lumber sections formed between hanger-bars disposed adjacent to each other, consisting of a pair of unloader-blocks each having a concave part, and a pair of unloader-bars movable upwardly for engaging the lumber of a section and movable downwardly to conduct lumber to the concave parts of the unloader-blocks.

10. In unloading mechanism for upright lumber sections formed between adjacently disposed hanger-bars, a movable carrier, a car having a frame and disposed below the lumber sections, unloader blocks on the car frame, revoluble screws in bearings on the car frame each having a threaded connection with an unloader-block for disposing the block in the plane of a lumber section, unloader-bars on the car frame adapted to be moved upwardly into engagement with the lumber of a section and adapted to be moved downwardly for conducting lumber to the unloader-blocks for delivery to the carrier, co-operative devices on an unloader-bar and on the car frame for terminating the movement of said unloader-bars.

11. In unloading mechanism for vertical, approximately parallel lumber sections formed between hanger-bars disposed adjacent to each other, a car, a movable carrier, unloader blocks below the lumber sections and mounted on the car, unloader bars on the car adapted to be moved upwardly for engaging the lumber of a section and adapted to be moved downwardly for conducting lumber to the unloader blocks for delivery thereof to the carrier, one of said unloader bars having a projection, means for moving the car at approximately right angles to the lumber-sections, means for preventing a movement of the car, and devices on the car adapted to co-operate with said projection of an unloader-bar for terminating movement of said unloader-bars.

12. In unloading mechanism for upright lumber sections formed between pairs of adjacently disposed hanger-bars, a car below the lumber sections, unloader-blocks upon and adapted to be adjusted longitudinally of the car to be disposed in the plane of a lumber section, unloader-bars on the car and adapted to be moved upwardly into engagement with the lumber of a section and adapted to be moved downwardly for conducting the lumber to the unloader-blocks.

13. In unloading mechanism for upright lumber sections, reciprocating means for moving upwardly into engagement with the lumber of a section and then moving downwardly for lowering the lumber with relation to said sections to unload the same.

14. In unloading mechanism for upright lumber sections, a car movable beneath said sections, vertically reciprocable means on said car for moving upwardly into engagement with the lumber of a section and downwardly to lower said lumber, and means on said car to move the lumber from a vertical to a horizontal position during its descent.

15. In unloading mechanism for unloading lumber from upright hanger elements between which the lumber is retained by removable retaining elements, reciprocating means below said hanger elements and movable upwardly into engagement with the lumber to lift the same and hold it till the retaining elements are removed and then lower the lumber for unloading.

16. In lumber unloading apparatus, a car, an upstanding element movably mounted on said car for cooperating in the handling of the lumber, and means for adjusting the position of said upstanding element longitudinally of said car.

17. In unloading mechanism for upright lumber sections formed between adjacently disposed hanger elements, a car, a pair of unloader blocks on said car, and means for releasably securing each of the unloader blocks to the adjacent hanger element.

18. In unloading mechanism for upright lumber sections formed between adjacently disposed hanger elements, a car movable beneath said hanger elements, means on said car for moving upwardly into engagement with the lumber and then downwardly for lowering the same, a supporting element on each side of said car, staggered holes in said supporting elements, and locking means for entering whichever hole it is nearest to for holding said car beneath a desired section.

19. In unloading mechanism for lumber stored between supporting elements, a carriage movable across the ends of the spaces between said supporting elements, means on said carriage for removing lumber from said spaces, and mechanism for stopping the movement of said means when it has reached a predetermined position in its travel.

20. In unloading mechanism for upright lumber sections formed between adjacently disposed hanger elements in a seasoning house, means for moving upwardly into engagement with the lumber and then moving downwardly for lowering the same, means for maintaining the hanger elements in stationary relation to each other, and means for maintaining the hanger elements stationary with relation to the seasoning house while the lumber is being unloaded.

In testimony whereof, I have affixed my signature.

ROBERT Z. DRAKE.